United States Patent [19]
Williamson

[11] 3,714,452
[45] Jan. 30, 1973

[54] CIRCUIT BREAKER MONITOR FOR UNINTERRUPTABLE POWER SYSTEMS INCLUDING A STATIC BYPASS

[75] Inventor: Dennis F. Williamson, Media, Pa.

[73] Assignee: General Electric Company, New York, N.Y.

[22] Filed: Feb. 7, 1972

[21] Appl. No.: 224,195

[52] U.S. Cl. .................307/86, 307/64, 317/26, 340/292
[51] Int. Cl. .................................H02j 3/00
[58] Field of Search ........307/64, 66, 68, 86; 317/26, 317/335 C; 340/292; 321/12

[56] References Cited
UNITED STATES PATENTS

| | | |
|---|---|---|
| 3,530,360 | 9/1970 | Relation .................317/26 |
| 2,785,317 | 3/1957 | Langberg.............307/68 X |
| 3,201,592 | 8/1965 | Reinert.................307/68 X |

Primary Examiner—D. F. Duggan
Assistant Examiner—Harvey Fendelman
Attorney—J. Wesley Haubner et al.

[57] ABSTRACT

An uninterruptable power system including main apparatus for supplying power to a critical bus, the main apparatus includes electromechanical circuit breakers and a static switch. Bypass apparatus is also provided including a static switch to supply power to the critical bus in high-speed response to the actuation of the circuit breaker trip initiating means.

5 Claims, 2 Drawing Figures

CIRCUIT BREAKER MONITOR FOR UNINTERRUPTABLE POWER SYSTEMS INCLUDING A STATIC BYPASS

BACKGROUND AND OBJECTS OF THE INVENTION

This invention relates to means for protecting electric power distribution systems and circuits, and more particularly it relates to apparatus equipped with high speed fault-sensing and disconnecting means for minimizing disturbances on a critical power bus. The following published art, now known to applicant, is exemplary of prior art approaches relevant in this area of technology: U.S. Pat. Nos. 3,201,592-Reinert et al., 3,309,570-Goldberg, 3,337,742-Baeher et al., 3,530,360-Relation.

In the art of electric power distribution and protection, it is becoming increasingly important to minimize adverse effects of an abnormal condition in the source of power, in the distribution system itself, or in the electric load supplied thereby so that critical loads can continue operating with the least possible disturbance. Reliable power can be essential for loads such as computers, for example, where even a transient dip in voltage, or momentary loss of power, can result in serious errors or malfunctions in the utilization equipment and an extended outage could be intolerable. Consequently, to improve the quality and continuity of electricity supplied to such loads, electrical manufacturers have made available "uninterruptable power systems," sometimes referred to as no-break power supplies, for installation between the incoming power lines and the load. Such apparatus typically comprises combinations of rectifying, energy-storing, and inverting means so arranged as to faithfully energize a critical bus with highly stable A-C power regardless of disturbances in or failure of utility power.

In one common type of uninterruptable power system, which may be called a redundant inverter system, the critical bus is supplied by a plurality of inverters operating in parallel. In U.S. Pat. No. 3,530,360-Relation, which is assigned to the same assignee as my invention, there is disclosed and claimed means for detecting an impending failure of one of the inverters in such a system and for rapidly isolating it from the critical bus so that the faulty inverter itself does not disturb the load which continues to be energized by the other, sound inverters.

Another type of uninterruptable power system, which may be called a non-redundant, single-inverter system, consists of a single inverter for supplying power to the critical bus under normal conditions. The system also includes a bypass circuit for supplying power to the critical bus in the event that the inverter malfunctions. To that end a first static switch may be provided between the inverter and the bus and a second static switch may be provided in the by-pass circuit, the first switch to be rendered non-conductive and the second switch to be rendered conductive in response to the detection of an inverter fault. As soon as the malfunction is cured, this switching process is reversed and the inverter is returned to service, thereby restoring the desired buffer between the incoming power lines and the critical load.

Irrespective of the type of uninterruptable power system (i.e., whether a redundant inverter system or a non-redundant system) it is a desirable practice to include an electromechanical circuit breaker on the D-C input side of the inverter and an electromechanical circuit breaker on the A-C output side thereof in order to completely isolate the inverter whenever it is out of service for maintenance or repair purposes. Such breakers are ordinarily arranged to be automatically tripped in the event of certain failure modes in the inverter or its auxiliaries (e.g., commutation failure, failure of the cooling fans, etc.). In a non-redundant single inverter system it is also important to switch or transfer to the bypass circuit in response to the detection of any such malfunction so that power from the utility mains is provided to the critical bus without interruption.

A general object of my invention is the provision, for a non-redundant single inverter uninterruptable power system, of improved means for initiating high-speed transfer to a bypass circuit in response to the detection of any number of circuit abnormalities without a complex number of interlocks and sensors.

SUMMARY OF THE INVENTION

In carrying out my invention in one form I provide an uninterruptable power system including an inverter for converting D-C power to A-C power and supplying same to a critical bus. The input of the inverter is through a first electromechanical circuit breaker and the output of the inverter is through a second electromechanical circuit breaker. Each circuit breaker includes trip initiating means which is operative when actuated for initiating the opening of the circuit breaker. The trip initiating means are actuated by system monitoring means in response to certain abnormal conditions that may sometimes develop in the inverter or other parts of the apparatus. A first normally conductive static switch is connected between the inverter and the critical bus and a second normally nonconductive static switch is connected in a bypass circuit between utility mains and the critical bus.

Means are provided to monitor the circuit breakers' trip initiating means and to render the first static switch nonconductive and the second static switch conductive in high speed response to the actuation of such means.

DESCRIPTION OF THE DRAWINGS

My invention will be better under and its various objects and advantages will be more fully appreciated from the following description taken in conjunction with the accompanying drawings in which.

DETAILED DESCRIPTION OF THE PREFERRED EMBODIMENT

Figure 1:
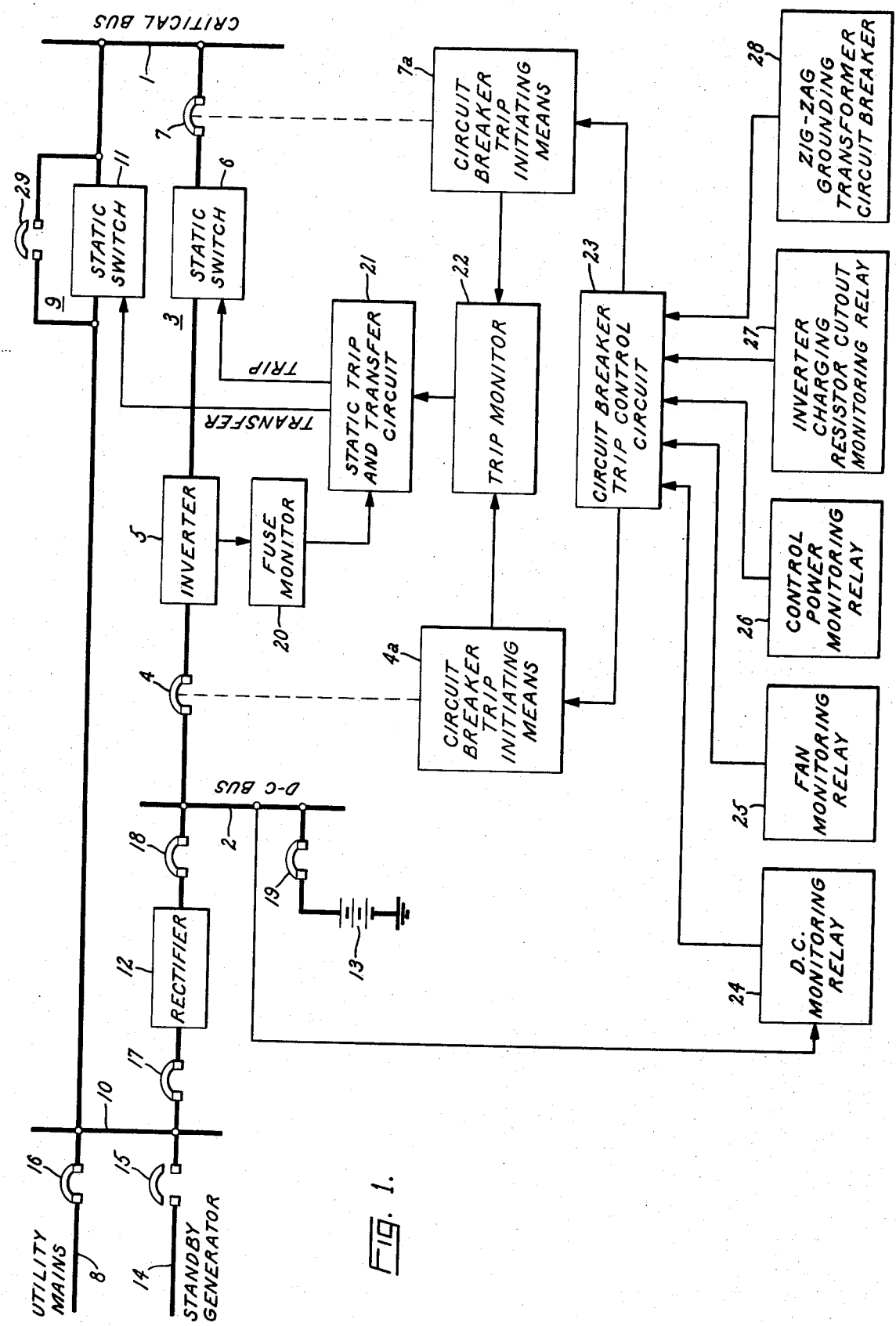
FIG. 1 is a one-line schematic diagram of an uninterruptable power system embodying my invention.

Referring now to FIG. 1, which is a one-line schematic diagram of a three-phase uninterruptable power system in accordance with my invention, a critical A-C electric power bus 1 is seen connected to a D-C bus 2 by main conducting apparatus 3 comprising the series combination of a D-C circuit breaker 4, an electric power inverter 5, a thyristor-composed, forced-commutation static switch 6, and an A-C circuit breaker 7.

The main apparatus, under normal conditions, is adapted for supplying A-C power to the critical bus. The critical bus is also adapted for direct energization from electric utility mains 8 in the event that there is an electrical abnormality in the main apparatus. To that end bypass apparatus 9 is connected between the utility mains and the critical bus 1. The bypass apparatus includes a thyristor-composed static switch 11.

The D-C bus 2 is supplied by a rectifier 12 that is normally energized by power delivered to an A-C bus 10 from the electric utility mains 8. Reliable energy storing means such as a storage battery 13, which is kept charged by the rectifier 12, is provided to energize the D-C bus during short-term outages of the mains. An emergency generating means such as a diesel standby generator 14 is provided to supply power, via circuit breaker 15, to the A-C bus 10 in the event of a long-term loss of utility power from the mains 8.

The critical A-C bus 1 is used to supply highly reliable, stable power to critical A-C load circuits. The load typically comprises a plurality of feeders or branches (not shown) each being connected to bus 1 and being individually protected by suitable overload responsive means such as electric fuses. The feeders may be used to supply power to one or more computers and peripheral equipment therefor or to other electrical apparatus requiring stable A-C power.

In normal operation of the uninterruptable power system shown in FIG. 1, the A-C bus 10 is energized via a closed circuit breaker 16 from the electric utility mains 8. The rectifier 12 is energized from the A-C bus via a closed circuit breaker 17. The output of the rectifier serves to energize the D-C bus 2 via a closed circuit breaker 18 as well as to charge the battery 13 via a closed circuit breaker 19.

The main apparatus 3 is operative for converting the D-C power from the bus 2 and for supplying it to the critical A-C bus 1. To that end the D-C power from the D-C bus is utilized to energize the inverter 5 via circuit breaker 4 which is in its conductive state. The inverter operates in synchronism with the A-C power from the electric utility mains 8 so that its alternating voltage output is in phase with the voltage on bus 10. (In my U.S. Pat. No. 3,614,461 there is shown and claimed means for accomplishing such a synchronization). The sinusoidal A-C power output of the inverter is fed via the static switch 6, which is in its conductive state, and the circuit breaker 7, which is also in its conductive state, to the critical bus. Both of the inverters' input and output circuit breakers 4 and 7 are of the electromechanical type so as to insure that the inverter is safely isolated from the D-C bus and the critical A-C bus respectively, when such isolation is desired. Although many types of electromechanical circuit breakers may be utilized, in one installation of my invention circuit breaker 4 is a molded case circuit breaker, type G.E.–TKMA836, and circuit breaker 7 is a molded case circuit breaker, type TKM836Y. Each of these circuit breakers is equipped with a conventional trip initiating means (e.g., a G.E.–TKMAUV11 undervoltage release) which is operative when actuated for initiating the tripping cycle of the circuit breaker. For example, circuit breaker 4 is equipped with trip initiating means 4A and circuit breaker 7 is equipped with trip initiating means 7A. Each of the trip initiating means includes a solenoid composed of a trip initiating coil and a plunger, the solenoid's plunger is biased by a spring and is coupled through mechanical linkages to a tripping mechanism (e.g., button) in the circuit breaker. As long as the coil of the initiating means is energized (i.e., the voltage thereon is above a predetermined level) the plunger will be held within the coil and against the action of the spring. Upon the deenergization of the coil the spring forces the plunger through its associated linkages into engagement with the tripping mechanism to initiate the opening of the circuit breakers main contacts. The trip initiating coil of trip initiating means 4A is denoted as UV4 and is shown in phantom lines in FIG. 2, and the trip initiating coil of trip initiating means 7A and denoted as UV7 is also shown in phantom lines therein. The other above-described components in each of the trip initiating means are not shown in the drawing.

It should be appreciated that other trip initiating means than the above noted undervoltage release can be utilized. As will soon be explained more fully, plural monitoring means or relays are provided to actuate the trip initiating means of the circuit breakers 4 and 7 in the event that an abnormality is detected in the apparatus.

During normal operation of the uninterruptable power system, i.e., when the main apparatus is supplying power to the critical bus, the static switch in the bypass apparatus is in its nonconducting state whereby it blocks the flow of A-C power directly between the utility mains 8 and the critical bus 1.

In the event of a fault in the inverter (e.g., a commutation failure) it is of utmost importance to quickly isolate the inverter from the critical bus and at the same time render the static switch in the bypass apparatus conductive so that the power supply to the critical bus will not be interrupted. To accomplish that end a fuse monitoring circuit 20, like that disclosed in the above-noted Relation patent, which can be referred to for further details of construction and operation, is connected to the inverter 5. This circuit is adapted for monitoring the inverter fuses and for causing a switch controlling circuit 21, hereinafter called a static trip and transfer circuit, to turn off or commutate, the conducting thyristors in the static switch 6 within a few microseconds of the detection of a fault in the inverter. In response to this same event and in the interests of safety the opening of the electromechanical output circuit breaker 7 is initiated. The static strip and transfer circuit also serves to render the thyristors in the bypass static switch 11 conductive within a very short time after the detection of the fault. Once static switch 11 begins conducting, power is supplied to the critical bus from the utility mains notwithstanding the isolation of the inverter from the bus. The transfer of power from the main apparatus static switch to the bypass apparatus static switch occurs so fast that the flow of power to the critical bus is virtually uninterrupted.

In the case of certain apparatus abnormalities in addition to inverter failures, it is also of considerable importance to terminate power conduction through the main apparatus and to commence power conduction through the bypass apparatus before any disturbance of the critical bus voltage can result. To that end I provide circuitry for rendering the bypass static switch 11 conductive (this function being hereinafter referred to as the transfer function) and for terminating conduction in the main static switch 6 (this function being hereinafter referred to as the trip function) in high-speed response to the detection of a system abnormality by any monitoring relay coupled to the trip initiating means for the inverters' input or output circuit breakers 4 and 7.

In accordance with my invention the trip and transfer functions are accomplished in a relatively simple manner which does not necessitate complex circuitry or interlocks between the relays monitoring the system conditions and the circuitry controlling the conduction status of the bypass apparatus and the main apparatus static switches. Furthermore, the trip and transfer functions are accomplished extremely quickly, even before the electromechanical circuit breakers can open. In particular I provide means which monitors the trip initiating means in the inverter input and output circuit breakers and provides a signal to initiate the trip and transfer functions in high-speed response to the actuation of the circuit breakers' trip initiating means. Such means is shown in FIG. 1 and includes a trip monitor circuit 22 which monitors the voltage on the trip initiating coils UV4 and UV7 of the circuit breakers 4 and 7.

The trip initiating coils are connected to trip control circuit 23 for the circuit breakers 4 and 7. This circuit is shown in detail in FIG. 2 and serves to keep the trip initiating coils energized when apparatus conditions are normal. As can be seen the circuit is connected across the D-C bus (i.e., between the relatively positive D-C conductor and ground) via a protective fuse F1 and a current limiting resistor R1 in series therewith. The circuit comprises a plurality of relay contacts, namely, C1, C2, C3 and C4 connected in series circuit relation with one another. The series combination of contacts C1, C2, C3 and C4 is connected in series with the series combination of another pair of relay contacts C5, a resistor R2 and a freewheeling diode D1. The undervoltage coil UV4 of trip initiating means 4A is connected across the diode D1. The series combination of contact C1 through C4 is also connected in series with the series combination of another set of contacts, C6, a resistor R3 and another freewheeling diode D2. The undervoltage coil UV7 of trip initiating means 7A is connected across the diode D2.

Each of the circuit breaker trip control circuit contacts is controlled by a device, (e.g., a relay) which monitors a specific apparatus condition. For example, the D-C bus voltage is monitored by a D-C monitoring relay 24. This relay is arranged to keep contact C1 closed as long as the D-C bus voltage is above a preselected level. The operation of a fan for cooling the apparatus is monitored by a fan monitoring relay 25. This relay is arranged to keep contact C2 closed as long as the fan is operating properly. A relay, denoted as the control power monitoring relay 26, monitors the existence of control power for the apparatus and keeps contact C3 closed so long as such control power exists. A relay 27 is provided to determine whether the resistor (not shown) which is utilized for initially charging the converters' commutation capacitors (not shown) has been cut out of the power circuit and for keeping contact C4 closed if such has occurred. A relay, 28, is provided to determine if a circuit breaker (not shown), connecting a zig-zag transformer (not shown) in the power circuit to provide a ground-to-neutral conductor for the critical bus, is closed, and for keeping contacts C5 and C6 closed if such is the case.

As should be appreciated, if all of the above-noted monitored system conditions are normal, contacts C1–C6 will be closed and the undervoltage release coils UV4 and UV7 will be energized therethrough from the D-C bus. In particular, the undervoltage coil UV4 will be energized by the current flowing from the D-C bus through fuse F1, the current limiting resistor R1, the closed contacts C1, C2, C3, C4 and C5, and the resistor R2. In a similar manner the undervoltage coil UV7 will be energized by the current flowing from the D-C bus through the fuse F1, the resistor R1, the closed contacts C1, C2, C3, C4 and C6, and the resistor R3.

As previously noted the undervoltage coils UV4 and UV7 are arranged such that upon being actuated by deenergization (i.e., when the voltage thereacross drops below a preselected level) they set in motion the tripping operation in their respective electromechanical circuit breakers 4 and 7. At the same time, the drop in the voltage across the coils is detected by the trip monitor circuit 22 and a signal indicative thereof is provided to the static trip and transfer circuit 21. In response to that signal the static trip and transfer circuit provides a tripping signal to the main apparatus static switch and at the same time provides a closing signal to the bypass apparatus static switch. In response to the tripping signal, commutation means (not shown) in the main static switch are activated to render the static switch nonconductive. This action occurs within a very short period of time (e.g., 50 microseconds or less). In response to the provision of the close signal for the bypass apparatus static switch, the thyristors therein begin conducting power to the critical bus from the A-C bus 10. The starting time (i.e., the time which elapses before the static switch conducts in response to the close signal) is quite small (e.g., 25 microseconds).

Accordingly, both the trip and transfer functions will be effectuated well before the opening of the electromechanical circuit breakers 4 and 7. Furthermore, owing to the short turnoff time of the main apparatus static switch and the short starting time of the bypass apparatus static switch, the duration of the switching transient from the time a trip and transfer signal is initiated is of the order of 1 millisecond or less, including settling time, whereupon the voltage on the critical bus will remain virtually undisturbed.

Figure 2:
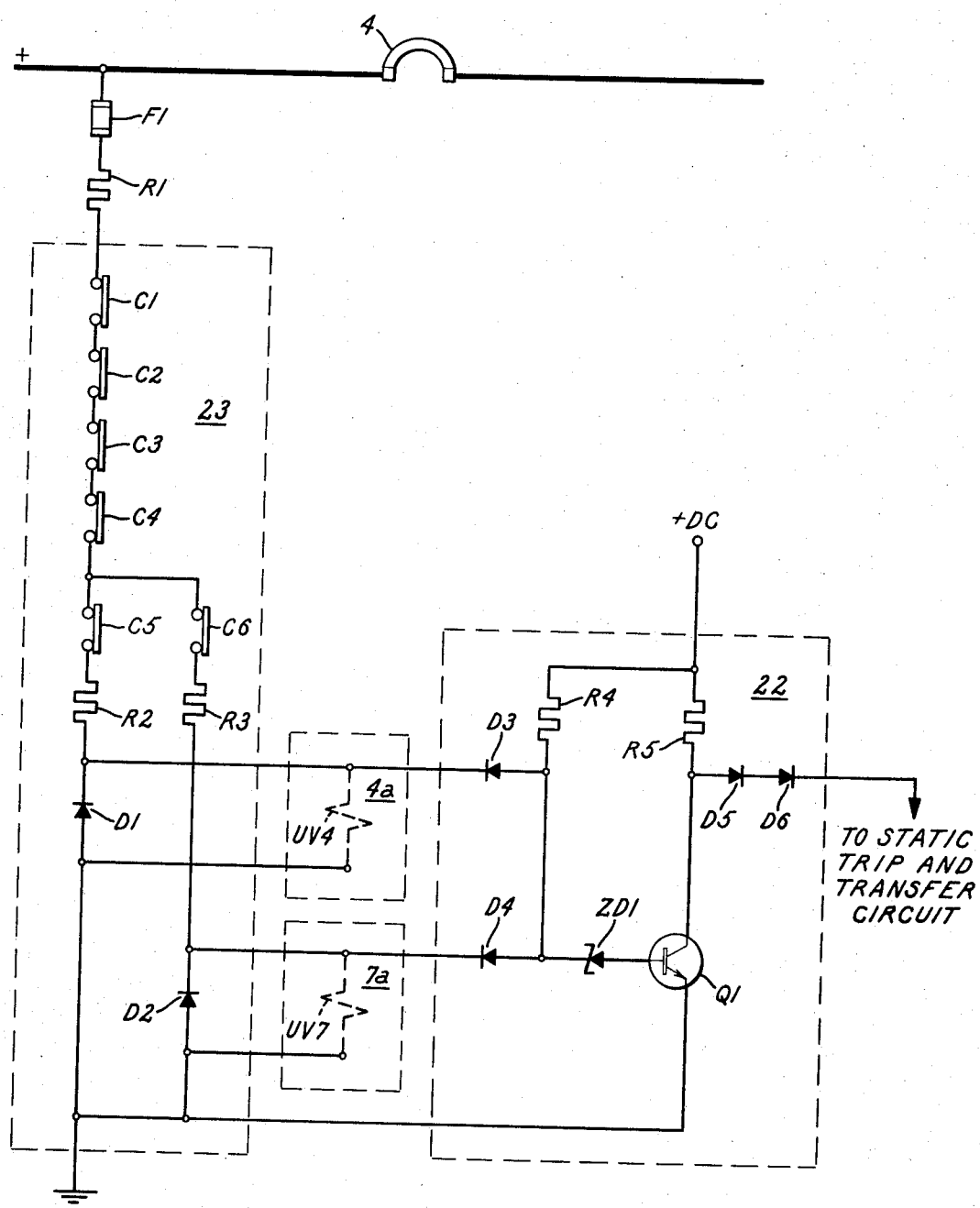
FIG. 2 is a schematic diagram of a portion of the uninterruptable power system shown in FIG. 1.

The details of a preferred embodiment of the trip monitor circuit 22 are shown in FIG. 2. As can be seen therein the inputs to the circuit are provided via a pair of diodes D3 and D4 connected to form an "or" gate. The or gate inputs are connected across the undervoltage coils UV4 and UV7, respectively. The anodes of the input diodes are connected to a biasing resistor as R4 and to the cathode of a zener diode ZD1. The anode of the zener diode is connected to the base of a transistor Q1. The collector of the transistor is biased from a positive D-C supply via a biasing resistor R5. The emitter of the transistor is connected to ground. The output of the transistor is provided from the collector via a pair of voltage dropping diodes D5 and D6 to the static trip and transfer circuit 21.

Operation of the monitor circuit is as follows:

When the voltage on either coil UV4 and UV7 is above the breakdown voltage of the zener diode, transistor Q1 is biased "on" via resistor R4 and zener diode ZD1 (the zener diode insures that the base voltage does not go too high with respect to the emitter voltage). When transistor Q1 is on (i.e., conducting), the voltage appearing at its emitter is effectively ground. If the voltage on either of the undervoltage coils drops below the breakdown voltage of the zener diode the transistor will turn off whereby a positive signal will appear at its collector. This positive or output signal is supplied to the static trip and transfer circuit to initiate the trip and transfer function.

It should be appreciated that the trip monitor output signal will be produced well in advance of the opening of the circuit breakers 4 and 7 notwithstanding the fact that the trip initiating means of the circuit breakers 4 and 7 is concurrently responding to the same condition, i.e., the dropping of the voltage across the undervoltage coils.

Since the trip monitor circuit responds to a drop in voltage across the circuit breaker undervoltage coils, a failure in either one of these coils (which usually manifests itself in a short circuit) will also result in the initiation of the trip and transfer function in the same manner as if a monitoring relay had sensed a system abnormality. For this reason I prefer to monitor both UV coils rather than just one.

As can be seen in FIG. 1 a circuit breaker 29 is connected in shunt with the bypass static switch 11. This breaker is preferably of the electromechanical type and is closed a short period of time, (e.g. a few cycles) after the bypass static switch is rendered conductive. Backing up a first-on static switch with a slower closing main breaker is an old expedient in the art (See U.S. Pat. Nos. 3,237,030 and 3,401,303). By utilizing such a back-up circuit breaker the bypass static switch can be constructed of smaller thyristors since they will only be required to carry power to the critical bus for a few cycles until the circuit breaker 29 closes.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. In an electrical system including main apparatus and bypass apparatus for providing A-C power to a critical bus, said bypass apparatus including a first normally nonconductive static switch connected between a supply of A-C power and said bus, said main apparatus including an inverter for converting D-C power into A-C power, a first normally conductive circuit breaker connected between the inverter and a supply of D-C power and means comprising, a second normally conductive static switch in series with a second normally conductive circuit breaker for connecting the inverter to said bus, said circuit breakers including trip initiating means operative when actuated for causing the circuit breakers to become nonconductive, said initiating means being actuated in response to the detection of an abnormality in said main apparatus, the improvement comprising: switch controlling means operative in high-speed response to the actuation of at least one of said trip initiating means for causing said second static switch to interrupt the flow of power through the main apparatus to said critical bus, and at the same time for causing said first static switch to begin conducting power from said A-C power supply to said bus, whereupon the flow of A-C power to said bus is virtually uninterrupted.

2. The electrical system as specified in claim 1 wherein said circuit breaker trip initiating means includes undervoltage sensitive means which are normally energized to a voltage above a predetermined threshold level in response to relay means monitoring predetermined conditions in said main apparatus, and wherein upon the detection of an abnormality by said relay means the voltage appearing on the undervoltage sensitive devices falls below said threshold level.

3. The electrical system as specified in claim 2 wherein said static switch controlling means comprises means for monitoring the voltage appearing on the circuit breaker undervoltage sensitive means and for causing said second static switch to become nonconductive and said first static switch to become conductive in high-speed response to the voltage on either of the undervoltage sensitive means dropping below the threshold level.

4. The electrical system as specified in claim 3 wherein said main apparatus also includes means for monitoring fuses in the inverter and wherein said static switch conduction controlling means includes means for causing said second static switch to become nonconductive and said first static switch to become conductive in high-speed response to said last mentioned means.

5. The electrical system as specified in claim 3 wherein a third circuit breaker is connected in shunt with said first static switch and which is rendered conductive a short time after said first static switch is rendered conductive and wherein all of said circuit breakers are of the electromechanical type.

* * * * *